US007269661B2

(12) United States Patent
Ree et al.

(10) Patent No.: US 7,269,661 B2
(45) Date of Patent: Sep. 11, 2007

(54) METHOD USING RECEIVE AND TRANSMIT PROTOCOL AWARE LOGIC MODULES FOR CONFIRMING CHECKSUM VALUES STORED IN NETWORK PACKET

(75) Inventors: Bradley Richard Ree, 2935 Emerson Lake Dr., Snellville, GA (US) 30078; Robert P. Basil, Lawrenceville, GA (US); Khanh Mai, Alpharetta, GA (US); Donald Pruitt, Dahlonega, GA (US)

(73) Assignee: Bradley Richard Ree, Cumming, GA (US)

( * ) Notice: Subject to any disclaimer, the term of this patent is extended or adjusted under 35 U.S.C. 154(b) by 715 days.

(21) Appl. No.: 10/364,275

(22) Filed: Feb. 11, 2003

(65) Prior Publication Data

US 2003/0182440 A1 Sep. 25, 2003

Related U.S. Application Data (60) Provisional application No. 60/356,248, filed on Feb. 12, 2002, provisional application No. 60/358,525, filed on Feb. 21, 2002.

(51) Int. Cl.
*G06F 15/16* (2006.01)
(52) U.S. Cl. .......................................... 709/230; 710/52
(58) Field of Classification Search ........ 709/213–216, 709/245, 250, 230; 710/5–7, 52–57; 375/259; 370/389, 463; 379/265.02
See application file for complete search history.

(56) References Cited

U.S. PATENT DOCUMENTS

| 5,430,842 | A | 7/1995 | Thompson et al. |
| 5,500,864 | A | 3/1996 | Gonia et al. |
| 5,663,952 | A | 9/1997 | Gentry, Jr. |
| 5,802,065 | A | 9/1998 | Ogawa et al. |
| 6,034,963 | A | 3/2000 | Minami et al. |
| 6,246,683 | B1 | 6/2001 | Connery et al. |
| 6,279,140 | B1 | 8/2001 | Slane |
| 6,289,023 | B1 | 9/2001 | Dowling et al. |
| 6,888,937 | B1* | 5/2005 | Kurapati ................. 379/265.02 |
| 2001/0001616 | A1* | 5/2001 | Rakib et al. ................. 375/259 |
| 2001/0047406 | A1* | 11/2001 | Araujo et al. ............... 709/223 |
| 2001/0053148 | A1* | 12/2001 | Bilic et al. .................. 370/389 |
| 2002/0013821 | A1* | 1/2002 | Kasper ........................ 709/213 |
| 2002/0071450 | A1* | 6/2002 | Gasbarro et al. ........... 370/463 |
| 2002/0124108 | A1* | 9/2002 | Terrell et al. ............... 709/245 |
| 2004/0003126 | A1* | 1/2004 | Boucher et al. ............ 709/250 |
| 2004/0030754 | A1* | 2/2004 | Ree ............................ 709/213 |

\* cited by examiner

*Primary Examiner*—Le Hien Luu

(57) ABSTRACT

A network processor with modified transmit and receive paths in order to achieve higher bandwidth between a network interface to an attached user's circuit. The network processor includes a shared data buffer in which the network interface, processor, and user's interface all have access. The network processor also includes protocol aware logic that offloads much of the processor's tasks, and improves bandwidth. This abstract is provided as a tool for those searching for patents, and not as a limitation on the scope of the claims.

26 Claims, 7 Drawing Sheets

METHOD USING RECEIVE AND TRANSMIT PROTOCOL AWARE LOGIC MODULES FOR CONFIRMING CHECKSUM VALUES STORED IN NETWORK PACKET

This application builds upon concepts in two co-pending United States provisional applications assigned to Simplified Silicon, Inc., the assignee of the present application. More specifically, this application claims priority to U.S. Provisional Application No. 60/356,248 filed Feb. 12, 2002 for Network Processor with Improved Receiver and to U.S. Provisional Application No. 60/358,525 filed Feb. 21, 2002 for Network Processor with Improved Transmitter. These applications are incorporated by reference, however, to the extent that they differ from the material in this application, (barring clerical error) the latter application controls.

BACKGROUND OF THE INVENTION

1. Field of Invention

The present invention relates generally to the packet based data communications field, and more particularly, relates to a network processor that includes a shared data buffer between the user interface, network interface, and processor. The invention also includes protocol aware logic that monitors the data being written into the shared buffer.

2. Description of Related Art

Figure 1:
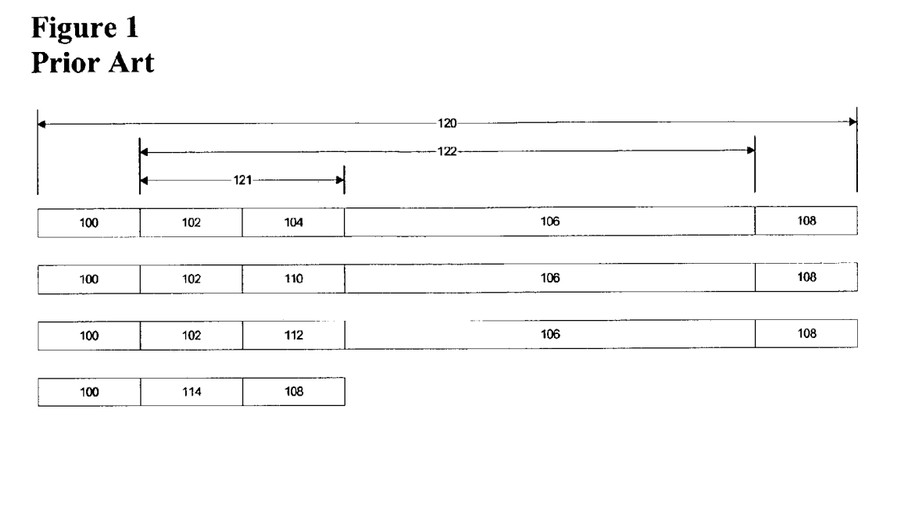
FIG. 1 is a diagram illustrating the prior art packet layers used in TCP, UDP, ICMP, and ARP network messages.

Internet and Intranet traffic typically consist of four different types of packets, ARP, ICMP, UDP, and TCP (see FIG. 1). When sent over an Ethernet link, these packets are embedded inside an Ethernet packet. All these packets have an Ethernet header 100, one or more protocol headers 121, and a data payload 106. The most common protocol is the Internet Protocol (IP), which has two sub protocols: transmission control protocol (TCP), and user datagram protocol (UDP). An IP packet 122, consists of an IP header 102, TCP header 104 (or UDP header 110 or an ICMP header 112), and a data payload 106. TCP is used for breaking up the data to be sent into datagrams, reassembling the datagrams at the other end, resending any datagrams that are lost, and finally re-assembling them in the correct order. UDP is a much simpler protocol that also breaks up the data into datagrams but does not have all the functionality of TCP. The overlying protocol of both UDP and TCP is IP. IP is used for the actual routing of datagrams. The Internet control message protocol (ICMP) is sometimes used for diagnostics and communication between two nodes on the network. These messages are not used to pass user data.

The basic format of a network packet 120 that is an IP packet 122 sent under the Ethernet transport protocol over any Ethernet link is as follows: Ethernet header 100, IP header 102, a TCP header 104 (or an UDP header 110 or an ICMP header 112), data payload 106, and the Ethernet checksum 108. The protocol headers 121 for IP packets include the IP header 102, TCP header 104, UDP header 110, or ICMP header 112. Other network packets based on different combinations of protocols would appear differently but would repeat the general pattern of a series of two or more nested protocols with the transport protocol as the top (outer) layer.

For example, if the transport protocol is something other than Ethernet, then the Ethernet header 100 and the Ethernet checksum 108 would be replaced with the header and checksum (if any) for that particular transport protocol. Typically, for Ethernet and other transport protocols, the transport header is generated in the network stack (described below) and the transport checksum is generated in the network interface (described below).

To understand, the ARP packet, (shown as the fourth packet in FIG. 1), it is useful to introduce some of the basic functions the Internet protocol uses to communicate.

Every device on the Internet or an Intranet that uses Ethernet to communicate has a unique MAC identifier that is programmed into the device by the manufacturer of the device. When two points, ("nodes"), want to communicate, they must do so by an underlying protocol. Most frequently, this will be Internet Protocol or IP. IP also has addresses for addressing one or more nodes and are used for relaying traffic between two or more nodes. IP addresses come as two different varieties, public and private. Public IP addresses are unique addresses that are registered with the Network Information Center, www.internic.net. Private IP addresses are reserved IP address ranges that can never be registered, but can be used behind protective networking devices called routers. The router will have a unique public IP address that it uses to talk on the Internet with other devices.

The IP protocol allows nodes to communicate using the IP address of each node. Not all IP addresses are unique, yet all MAC addresses are unique. Thus, when two devices need to communicate, they must take their unique addresses (MAC) and bind them to the addresses used to route data on the Internet/Intranet which are not always unique. Therefore, when MAC identification is bound to the IP address, address resolution protocol (ARP) is used. ARP is not an IP packet, thus the packet consists of the Ethernet header 100, ARP header 114, and the Ethernet checksum 108. Once the IP address is bound to the MAC address through ARP messages, TCP or UDP communications can take place. Typically, a node maintains a list of IP addresses bound to the MAC address. ARP messages are sent if the node does not have a MAC address for the IP address being contacted, or when the communication to the stored IP/MAC address fails.

Figure 2:
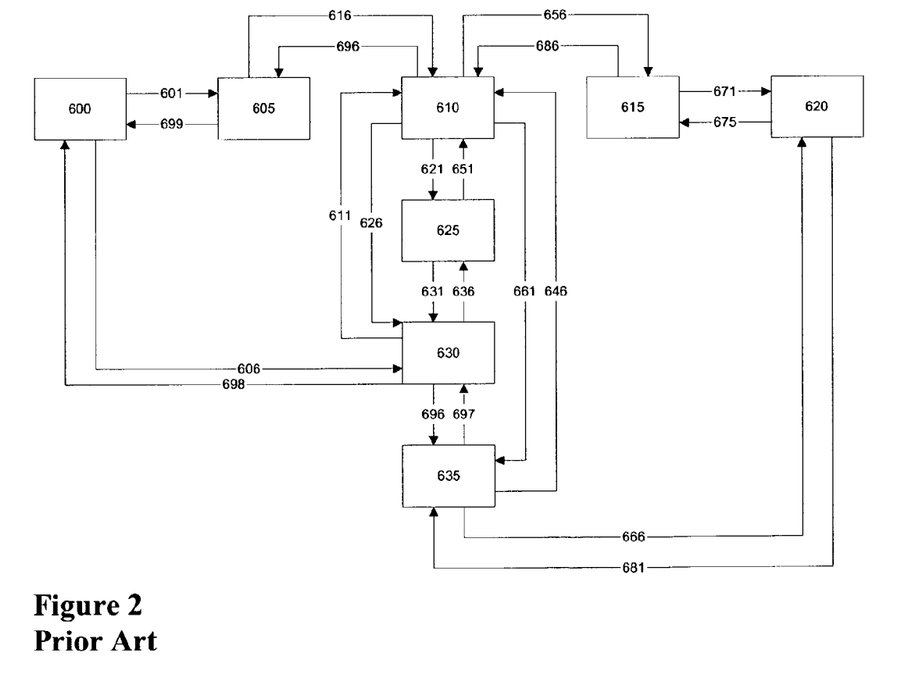
FIG. 2 is an exemplary block diagram of the prior art for network processors.

Referring to FIG. 2, a network nodes typically include a network interface 600, which has a network buffer 605, a DMA engine 610, a processor executing a network stack (or more simply the "network stack") 630, at least one application 635, processor memory 625, and a user interface 620, which has a user buffer 615.

This system can be broken into three major modules: the network interface 600, processor running a network stack 630 and an application 635, and user interface 620. To allow all these modules to operate independent of each other, local buffers have been added (605, 625, and 615). When data from a first module is required in a second module, the DMA engine 610 performs a fast copy from one module to the other. Typically, there is one bus on which all three modules reside, thus the DMA engine 610 can only service one copy request at a time as the copy ties up the shared bus. (Shared bus not shown in FIG. 2 in order to avoid undue clutter in that figure).

Prior Art Processing of Packets from Network Interface

Figure 3:
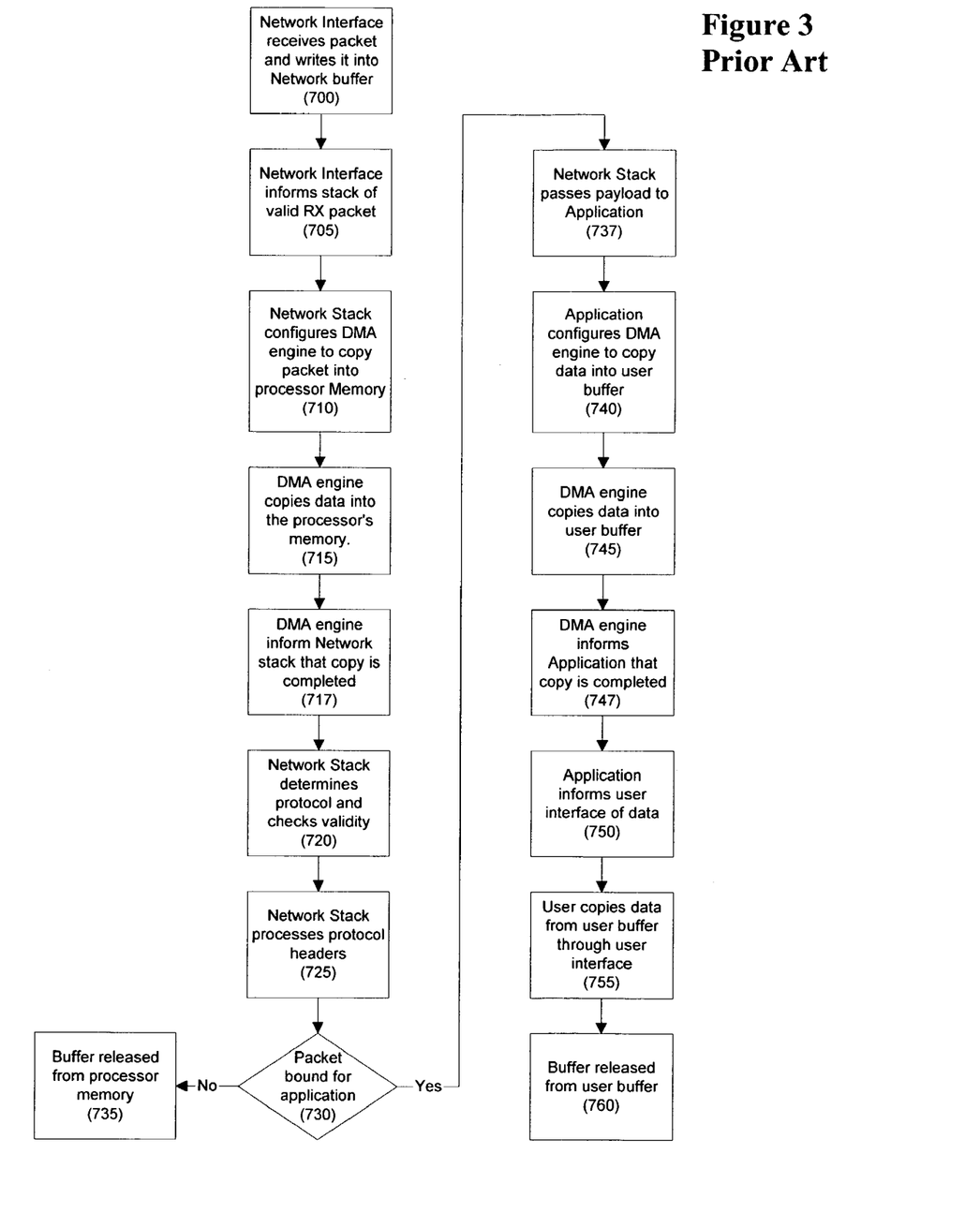
FIG. 3 is a flow chart illustrating the reception of packets in the prior art.

Having reference to FIG. 2 and FIG. 3, these are the steps associated with receiving a network packet 120, from the network interface 600. In order to promote the description of the process to one of skill in the art, the process is shown by a combination of interaction steps 601 to 699 on FIG. 2 and process steps 700 to 760 on FIG. 3.

STEP 601/700—As the network packet 120 is being received from the network; the network interface 600 writes the entire packet into the network buffer 605.

STEP 606/705—Once the entire network packet 120 has been received, the network interface 600, will inform the network stack 630.

STEP 611/710—The network stack 630 configures the DMA engine 610 to copy the entire network packet 120 from the network buffer 605 into the processor's memory 625.

STEP 616/621/715—The DMA engine 610 reads the network packet 120 from the network buffer 605, and writes the network packet 120 into the processor's memory 625.

STEP 626/717—The DMA engine 610 informs the network stack 630 when the copy is completed.

STEP 631/720—The network stack 630 reads the network packet 120 in the processor's memory 625 and determines which protocols are used, and if the packet is valid.

STEP 636/725—The network stack 630 must process portions of the protocol headers 121, and update the socket management data structure (not shown) stored in the processor's memory 625. (A socket is a connection between two network devices on a specific port.)

BRANCH 631/730—The network stack 630 then checks the network packet 120 stored in the processor's memory 625 to determine if the network stack 630 is the final destination, or if the data payload 106 is bound for the user's interface 620.

STEP 636/735—If the network packet 120 is to be consumed by the network stack 630, then the network packet 120 will be processed by the network stack 630, and the packet buffer will be released from the processor's memory 625.

STEP 696/737—If the network packet 120 is bound for the user interface 620, the data payload 106 is passed to the application 635.

STEP 646/740—The application 635 configures the DMA engine 610 to copy the data payload 106 of the network packet 120 from the processor's memory 625 into the user buffer 615.

STEP 651/656/745—The DMA engine 610 reads the data payload 106 from the processor's memory 625, and writes it into the user buffer 615.

STEP 661/747—The DMA engine 610 informs the application 635 when the copy is completed.

STEP 666/750—The application 635 informs the user interface 620 of a valid data payload 106 in the user buffer 615.

STEP 671/755—The user's circuitry then reads the data payload 106 in the user buffer 615 through the user interface 620.

STEP 675/760—The packet buffer is released in the user buffer 615.

Prior Art Processing of Payloads from User Interface

Figure 4:
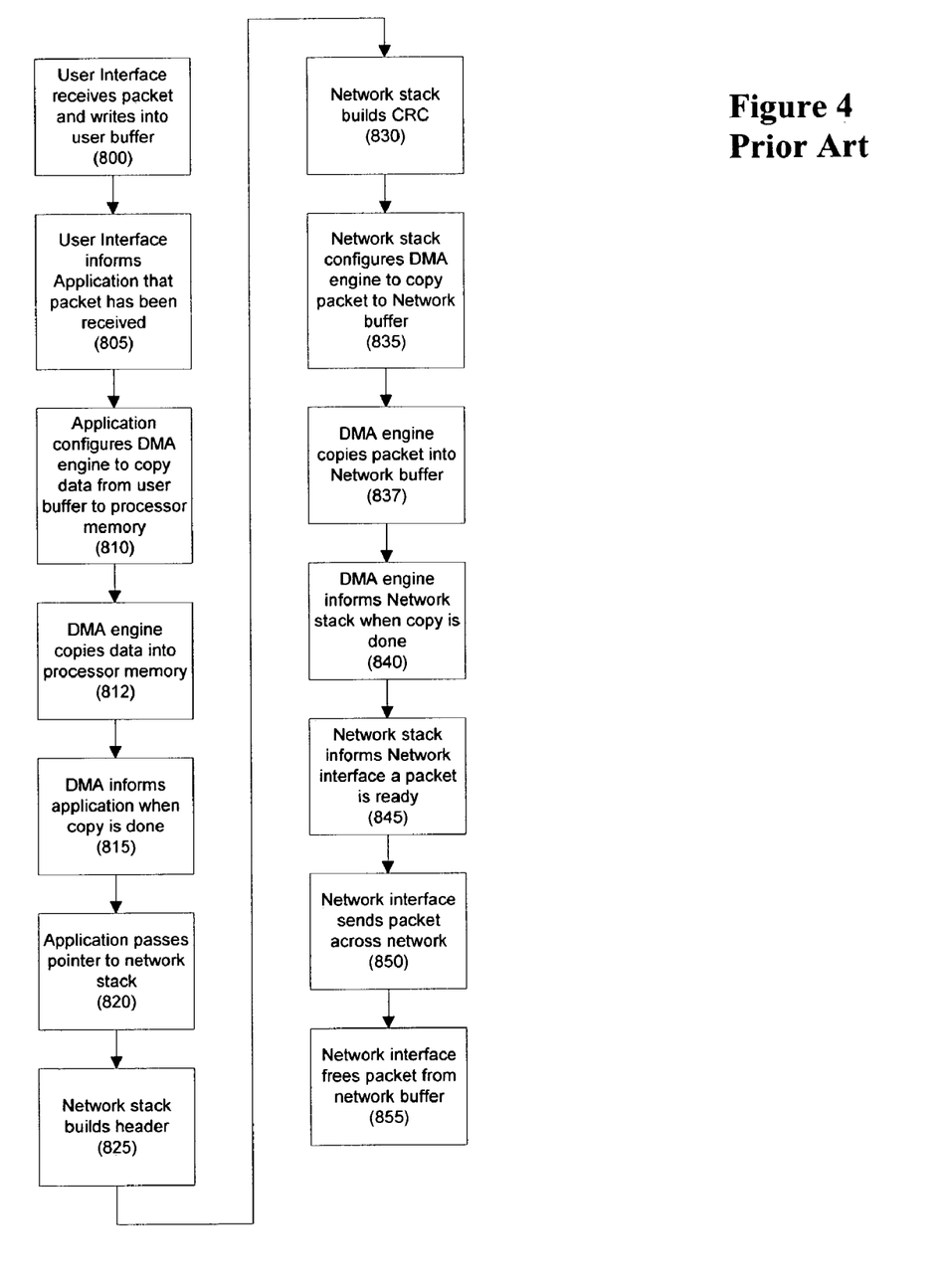
FIG. 4 is a flow chart illustrating the transmission of packets in the prior art.

Having reference to FIG. 2 and FIG. 4, these are the steps associated with the prior art method of receiving a data payload 106, from the user interface 620. In order to promote the description of the process to one of skill in the art, the process is shown by a combination of interaction steps 601 to 699 on FIG. 2 and process steps 800 to 855 on FIG. 4.

STEP 675/800—The user's circuit starts by writing a data payload 106 into the user buffer 615 through the user interface 620.

STEP 681/805—When the entire data payload 106 has been written, the user interface 620 informs the application 635 that the data payload 106 for a network packet 120 is ready for transmission.

STEP 646/810—The application 635 configures the DMA engine 610 to copy the data payload 106 from the user buffer 615 into the processor—s memory 625.

STEP 686/621/812—The DMA engine 610 copies the entire data payload 106 from the user buffer 615 into the processor's memory 625.

STEP 661/815—The DMA engine 610 informs the application 635 that the copy has been completed.

STEP 697/820—The application 625 passes a pointer to the data payload 106 stored in the processor's memory 625 to the network stack 630, and informs the network stack 630 what socket to send the network packet 120 on the network.

STEP 636/825—The network stack 630 builds the protocol headers 121. When there are a series of nested protocols below the transport layer, the network stack 630 would build all of the lower layer protocol headers. The protocol headers 121 are based on the socket identified supplied by the application 625 in STEP 697/820. Thus, a socket using IP would get an appropriate IP header.

STEP 636/830—The network stack 630 calculates the checksums for each protocol below the transport layer, and writes the values into the protocol headers 121. (For purposes of this application, CRC values (cyclical redundancy check values) and are a type of checksum). (The transport layer checksum is calculated by the network interface 600.)

STEP 611/835—The network stack 630 then configures the DMA engine 610 to copy the network packet 120 from the processor'memory 625 to the network buffer 605

STEP 651/696/837—The DMA engine 610 reads the network packet 120 from the processor's buffer 625 and writes it into the network buffer 605.

STEP 626/840—The DMA engine 610 informs the network stack 630 when the copy has been completed.

STEP 698/845—The network stack 630 informs the network interface 600 that a network packet 120 is ready for transmission.

STEP 699/850—The network interface 600 reads the network packet 120 from the network buffer 605 and sends it across the network after adding the transport layer header and checksum, in this case 100 and 106. .

STEP 601/855—The network interface 600 releases the packet buffer from the network buffer 605.

As illustrated by FIGS. 2 to 4 and the associated descriptions, the prior art suffers from several drawbacks. First, large amounts of memory are required. The network interface 600, processor 630, and user interface 620 must all contain buffers, which increase system cost and complexity. Another drawback is the network packet 120 must be copied between the network interface 600, processor 630, and user interface 620, which consume time that could be used for packet processing. As network data rates increase, these copies affect system bandwidth. Typically, the network buffer 605, user buffer 616, and processor memory 625 only have one bus (not shown) to transfer data between each of the buffers. As packet transfer rates increase, this bus becomes a limiting element in bandwidth. Finally, many protocol-processing tasks are better suited for a hardware implementation that allows for parallel processing, as opposed to the current sequential methods used in a pure software implementation.

While the prior art has suggested the use of a state machine in order to address previously recognized shortcomings with the prior art, this solution does not address the issue of future protocol support. Since a state machine solution calls for the protocol processing to be handled purely in hardware, the addition of new protocols would require a new device to be built. Replacing those devices already in use becomes very difficult and expensive. Another problem with the state machine solution is special user software cannot be performed in the device. Therefore, another processor must be attached to the state machine device in order to run a user's application. Finally, the state machine solution becomes very complex and expensive for certain protocols. For example, a web server is very complex, and must be configurable to handle many different user web pages. The state machines to handle these pages would become far too large and complex to be commercially viable.

While the prior art has taught that offloading the steps of checksum generation and verification from the processor can be beneficial, this offloading by it self is not sufficient to provide a highly efficient method for handling incoming and outgoing packets. This prior art solution does not eliminate the number of buffers required, nor does it remove the need to copy the packet between each of these buffers. Likewise, this prior art solution does not allow for the protocol header to be processed in parallel with the data payload reception.

While the prior art has taught filtering for established socket connections that allow the network interface to pass the protocol headers to the network stack and the data payload to the user application, it only occurs after the protocol headers and data payload are completely received in the network buffer. Both the protocol headers and data payload must still be copied into the processor's memory. The data payload must then be copied into the user interface. This prior art solution is adapted for interfacing with a user application residing on a personal computer. This solution could also be applied to an embedded environment in which the application is replaced with a user buffer and user interface. In this case, three separate buffers are still required; the network buffer, processor memory, and user buffer. Data copies are also still required to move the packet portions between the buffers. This prior art solution also has shortcomings for packet transmissions from the user interface to the network interface. The protocol checksums are based on the data payload, and protocol headers. Since these two parts are separated in the prior art, the transmit protocol checksum generation becomes difficult.

It is an object of the present invention to provide an improved method for handling the receipt of incoming packets in order to improve the efficiency of handling incoming packets.

It is another object of the present invention to provide an improved method for handling the outgoing packets in order to improve the efficiency of handling outgoing packets.

It is a further object of the present invention to develop a method that uses a shared buffer such that data may be shared among the network interface, the user interface, or the processor without the need to be copied for each subsystem to use the data.

It is yet another object of the present invention to use "protocol aware logic" in conjunction with the write path to the shared buffer to offload a portion of the processor workload.

It is yet another object of the present invention to develop a more efficient method for processing packets by processing solely the header portion of packets and not the data payload.

It is yet another object of the present invention to develop a method that increases throughput through use of parallel processing and the avoidance of memory copies of packets.

It is yet another object of the present invention to allow certain packets to be passed from the network receiver to the user interface without the use of the processor.

These and other advantages of the present invention are apparent from the drawings and the detailed description that follows.

SUMMARY OF THE INVENTION

The invention provides a low-cost, low-power, and high-bandwidth network interface. The packet receive and transmit paths have been highly optimized through the use of a shared memory buffer and protocol aware logic. The shared memory buffer eliminates data copies between the network interface and user interface, while allowing the processor to analyze and build the protocol headers for the packet. Protocol aware logic has been added to reduce the physical size of the processor, reduce the amount of code required for the network stack, and allow for parallel processing of the protocols. These improvements greatly reduce cost and power requirements, while increasing bandwidth.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 5:
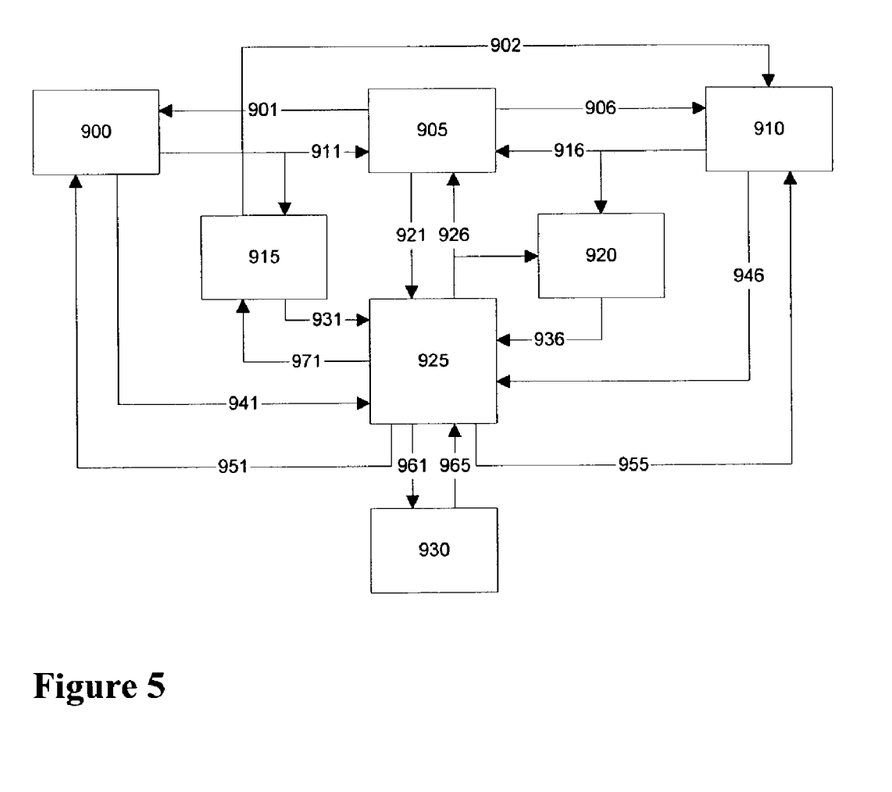
FIG. 5 is a block diagram of one preferred embodiment of the network processor.

FIG. 5 illustrates the preferred embodiment of the improved network processor. The device still contains three basic modules: network interface 900, processor unit with a network stack 925, (or more simply "network stack") and user interface 910. The user interface is capable of supporting more than one type of interface signaling method. For example, a synchronous FIFO interface could be enabled in the user interface by the processor, or another interface signaling method such as a standard memory mapped interface could be enabled instead.

All processor data structures and program instructions are located in the processor's memory 930. All data flow between the network interface and user interface is handled in one shared buffer 905. To reduce the workload of the processor and network stack 925, transmit protocol aware logic 920 and receive protocol aware logic 915 have been added to the transmit data path 916 and receive data path 911. Any packet to or from the network is stored in the shared buffer 905, and in the preferred embodiments never gets copied in the ways described in connections with FIGS. 2, 3, and 4. Therefore, a DMA engine (610 in FIG. 2) is not required for user packet processing.

Processing of Packets from Network Interface

Figure 6:
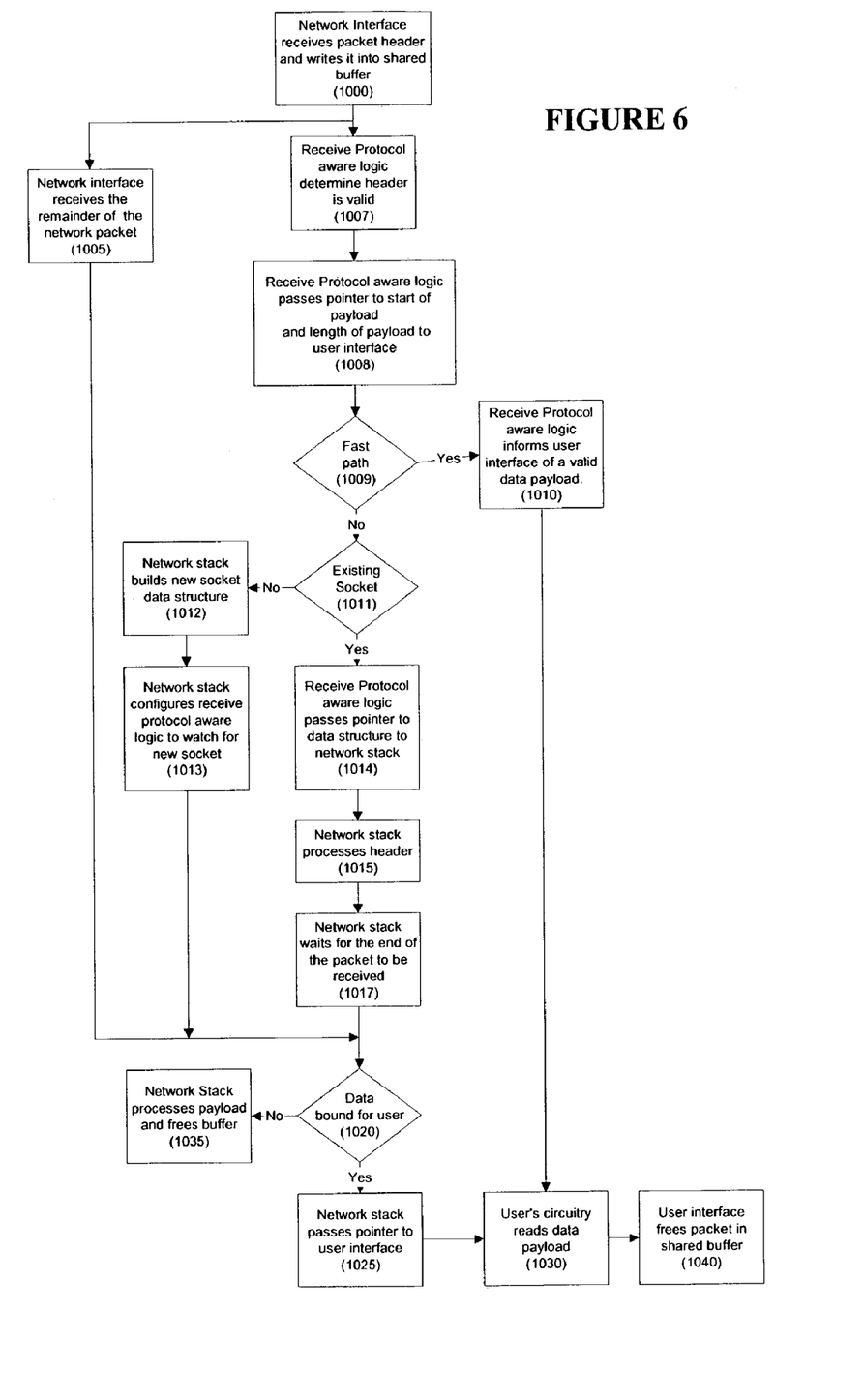
FIG. 6 is a flow chart illustrating the reception of packets in one preferred embodiment.

The preferred sequence of events for a packet received on the network interface 900 is shown in FIG. 5, and represented in FIG. 6. The data packets are illustrated in FIG. 1.

STEP 911/1000—As the Ethernet header 100 and packet header 121 is being received through the network interface 900, and written into the shared buffer 905, the receive protocol aware logic 915 is analyzing the packet protocols to determine the protocols being used, protocol checksum values, and which socket the packet is going to. The receive protocol aware logic 915 determines the above information through the use of protocol based checksum logic, and through analysis of the packet headers 121.

STEP 931/1007—The receive protocol aware logic 915 will determine if all lower level protocol checksum values are correct, and if the network packet 120 is bound for an existing socket. The network interface 900 determines if the Ethernet checksum is correct 108. If any of the checksums are incorrect, the network stack 925 will be informed. (A socket is a connection between two network devices on a specific port.)

STEP 902/1008—The receive protocol aware logic 915 passes the data payload's 106 length, and location to the user interface 910.

BRANCH 1009—The receive protocol aware logic 915 determines if the incoming network packet 120 is on a "fast path" socket. A "fast path" socket is configured by the processor 925, and must be a socket in which no response packet is required. Any socket using the UDP protocol would be a candidate. The "fast path" socket data payload 106 is passed directly from the network interface 900 to the user interface 910 without the use of the network stack 925. The receive protocol aware logic 915 passes all necessary data payload 106 information to the user interface 910, as described in STEP 902/1010.

STEP 902/1010—If the network packet 120 is on a "fast path" socket, then the receive protocol aware logic 915 informs the user interface 910 of a valid data payload 106. The data flow will continue at STEP 906/1030.

BRANCH 1011—If the network packet 120 is bound for an existing socket, the receive protocol aware logic 915 will provide the network stack 925 a pointer to the socket management data structure stored in the processor memory 930. The data flow will continue at STEP 931/1014.

STEP 961/1012—If the network packet 120 is not on an existing socket, the network stack 925 builds a new socket management data structure in the processor memory 930.

STEP 971/1013—The network stack 925 then configures the receive protocol aware logic 915 such that it can identify the newly created socket. Data flow will continue at STEP 921/926/1015.

STEP 931/1014—If the network packet 120 is on an existing socket, the receive protocol aware logic 915 will pass the network stack 925 a pointer to the socket management data structure stored in the processor memory 930.

STEP 921/926/1015—The network stack 925 starts to process the protocol headers 121 and builds any response needed in the shared buffer 905.

STEP 911/1005—While steps 931/1007 to 931/1014 are occurring, the network interface 900 writes the remainder of the network packet 106 into the shared buffer 905.

STEP 931/1017—The network stack 925 waits for the receive protocol aware logic 915 to signal the end of the network packet 120.

BRANCH 1020—The network stack 925 then determines if the network packet 120 is bound for the network stack 925, or the user interface 910.

STEP 921/1035—If the network packet 120 is bound for the network stack 925, it will process the data payload 106 and release the packet buffer from the shared buffer 905.

STEP 955/1025—If the data payload 106 is bound for the user interface 910, then the network stack 925 informs the user interface 910 of a valid data payload 106.

STEP 906/1030—The user's circuitry then reads the data payload 106 from the shared buffer 905 through the user interface 910. The data payload 106 will always appear to be located at the beginning of the shared buffer 905 to the user's circuitry, since the receive protocol aware logic 915 has determined the start of the data payload 106 based on the protocol being used. By removing the offset to the data payload 106, the user's circuitry does not need to have knowledge of the protocol used for any given socket. The offset and length were passed to the user interface in step 902/1008.

STEP 916/1040—Once the user's circuitry reads the entire data payload 106 from the shared buffer 905, the user interface 910 will release the entire network packet 120 from the shared buffer 905.

The invention has a number of major advantages for packet reception from the network interface 900 including:

First, data can move from the network interface 900 to the user interface 910 without any data copies. In contrast the prior art process illustrated in FIGS. 2 and 3 made copies at step 616/621/715 and at step 651/656/745;

Second, the shared buffer 905 eliminates the use of three separate buffers as used in the current state of the art (605, 615, and 625). The reduction of these three buffers into one equates to a significant decrease in silicon size, and thus a large reduction in device cost;

Third, the receive protocol aware logic 915 removes the time consuming tasks such as protocol and CRC verification by the processor;

Fourth, the protocol CRC calculations are performed in parallel while the packet is being written into the shared buffer 905, therefore the packet is known to be good or bad immediately after it has been received;

Fifth, the receive protocol aware logic 915 identifies packets bound for established sockets. For those packets, the receive protocol aware logic 915 provides a pointer to the socket management data structure stored in the processor's memory 930. This feature eliminates many sequential byte compares typically performed by the network stack, and a search through a socket table for every received packet; and Sixth, the receive protocol aware logic 915 utilizing the "fast path" is capable of identifying packets in which no processor intervention is needed. Instead, a pointer to the data payload 106 is directly passed to the user interface 910. Thus bandwidth is greatly increased by reducing the burden on the processor and allowing the processor to perform other tasks.

Processing of Payloads From User Interface

Figure 7:
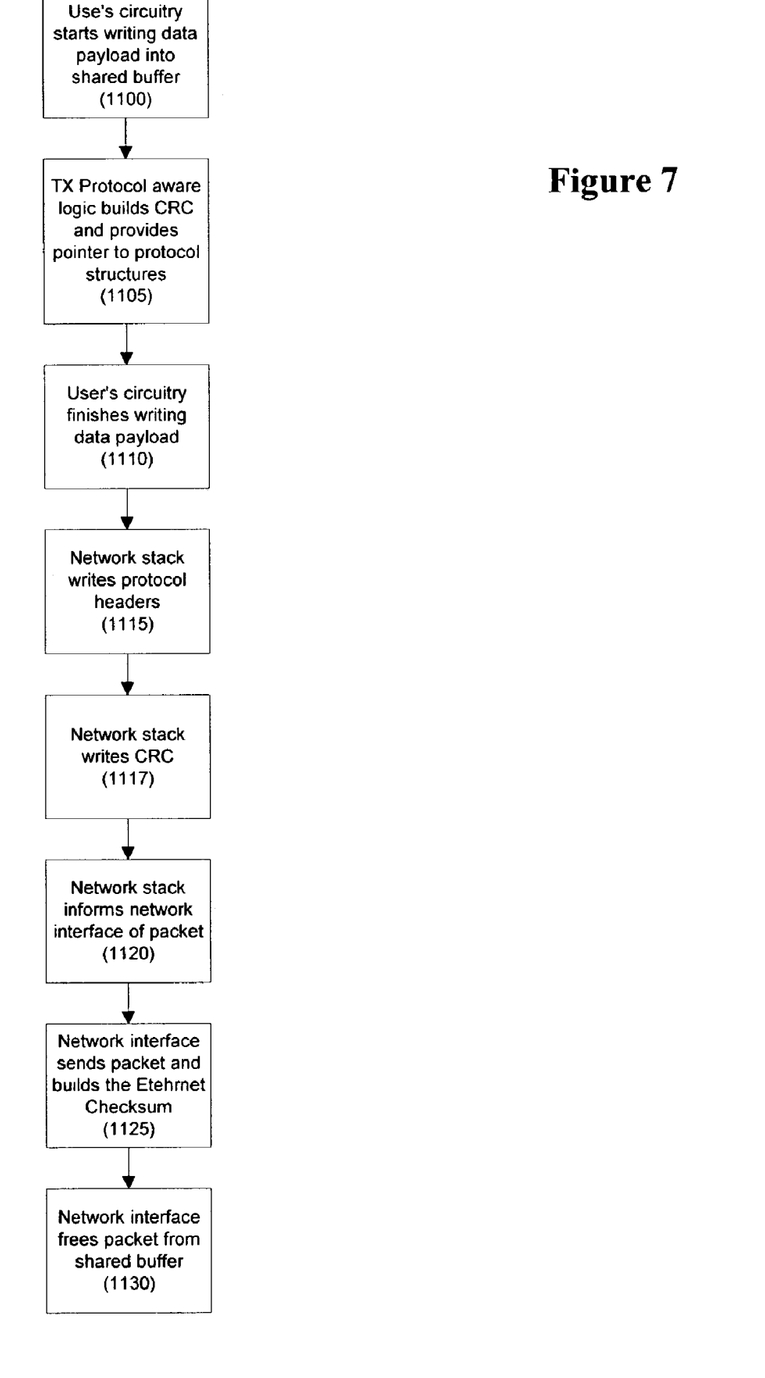
FIG. 7 is a flow chart illustrating the transmission of packets from the user interface in one preferred embodiment.

The preferred sequence of events for a data payload 106 received from the user interface 910 is shown in FIG. 5, and represented in FIG. 7. The data packets are illustrated in FIG. 1.

STEP 916/1100—The user's circuitry writes the data payload 106 into the shared buffer 905 through the user interface 910.

STEP 916/936/110513 As the data payload 106 is being written, the transmit protocol aware logic 920 starts to calculate all of the protocol checksums. The transmit protocol aware logic 920 also provides the network stack 925 a pointer to the socket management data structure stored in the processor's memory 930.

STEP 946/1110—When the user—s circuit has completed writing the data payload 106, the user interface 910 signals completion to the network stack 925.

STEP 965/926/1115—The network stack 925 then writes the protocol headers 121 based on the socket management data structure into the shared buffer 905.

STEP 936/926/1117—The network stack 925 writes the protocol checksums from the transmit protocol aware logic 920 into the protocol headers 121 which are stored in the shared buffer 905.

STEP 951/1120—The network stack 925 then informs the network interface 900 of the network packet 120 to be transmitted.

STEP 901/1125—The network interface 900 reads the network packet 120 from the shared buffer 905 and transmits it across the network. The network interface 900 also generates the Ethernet checksum 108.

STEP 911/1130—When the packet has been sent, the network interface 900 releases the packet buffer from the shared buffer 905.

The invention has a number of major advantages for data payload 106 receptions from the user interface 910 including:

First, data can move from the user interface 910 to the network interface 900 without any data copies. In contrast the prior art process illustrated in FIGS. 2 and 4 made copies at step 686/621/812, and step 651/696/837;

Second, the shared buffer 905 eliminates the use of three separate buffers as used in the current state of the art 605, 615, and 625;

The reduction of these three buffers into one equates to a significant decrease in silicon size, and thus a large reduction in device cost;

Third, the transmit protocol aware logic 920 eliminates the time consuming task such as protocol CRC generation by the processor;

Fourth, the protocol CRC calculations are performed in parallel while the packet is being written into the shared buffer 905;

Fifth, the transmit protocol aware logic 920 provides a pointer to the socket management data structure in the processor memory 930 to the network stack 925 for the socket in which the data payload 106 is associated; and Sixth, the transmit protocol aware logic 920 provides the offset in which the data payload 106 should be written into the shared buffer 905 for the protocol being used in the socket.

Processing of Packets From Network Stack

Figure 8:
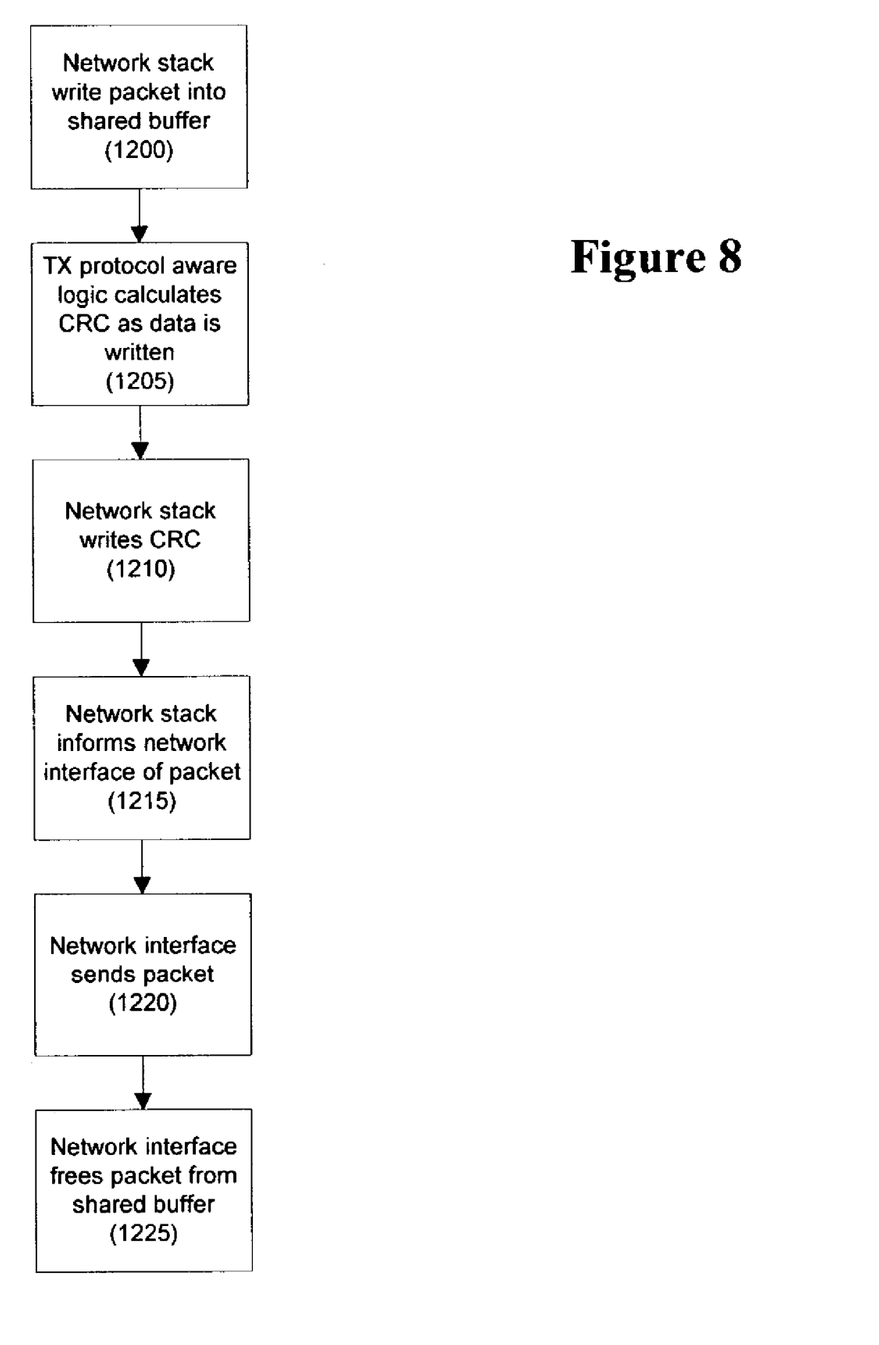
FIG. 8 is a flow chart illustrating the transmission of packets from the network stack in one preferred embodiment.

The preferred sequence of events for a network packet 120 received from the network stack 925 is shown in FIG. 5, and represented in FIG. 8. The data packets are illustrated in FIG. 1.

STEP 926/1200—The network stack 925 writes the network packet 120 into the shared buffer 905.

STEP 926/1205—As the network stack 925 is writing the network packet 120 into the shared buffer 905, the transmit protocol aware logic 920 calculates the protocol checksum.

STEP 936/926/1210—The network stack 925 writes the protocol checksums from the transmit protocol aware logic 920 into the protocol headers 121 which are stored in the shared buffer 905.

STEP 951/1215—The network stack 925 then informs the network interface 900 of the network packet 120 to be transmitted.

STEP 901/1220—The network interface 900 reads the network packet 120 from the shared buffer 905 and transmits it into the network. As part of this process the network interface 900 generates the Ethernet checksum 108 and inserts it.

STEP 911/1125—When the packet has been sent, the network interface 900 releases the packet buffer from the shared buffer 905.

Alternative Embodiments

Those skilled in the art could apply many modifications to the preferred embodiment. One such modification would be a second user interface in addition to the first, in which no protocol processing is performed in the second user interface. In the system with two user interfaces, only traffic on specific sockets would be processed by the network stack 900, receive protocol aware logic 915, transmit protocol aware logic 920, and the original user interface 910. If the traffic is not on the specific sockets, then the entire network packet 120 is sent unmodified either from the network interface 900 to the second user interface, or unmodified from the second user interface to the network interface 900. One use of such a system would be an intelligent Ethernet adapter board for personal computers. The original user interface 910 could be used to communicate with dedicated circuits on the personal computer without the need of the personal computer's operating system. These circuits would include system monitoring and diagnostic circuits. The second user interface would be a PCI interface, which would provide the main network connectivity to the personal computer's operating system.

Another embodiment that would increase packet throughput would be a modified shared buffer 905. Instead of a single buffer, the buffer would be broken into a transmit and a receive buffer. The transmit and receive buffers would consist of multiple receive packet buffers and multiple transmit packet buffers. The receive packet buffers and transmit packet buffers would have at least two ports, with one port connected to the network interface and the other port connected to either the processor or the user interface or both.

In the receive direction, the network interface would write the packet into one of the receive packet buffers. While the packet is being written into the receive packet buffer on one port, the processor would have access to the other port of the same packet buffer in order to process the protocol headers. Once the entire packet has been received, and the processor has completed the protocol header processing, the packet buffer would be passed to the user interface. The user interface would access the packet buffer through the same port that the processor had access to in the previous step.

In the transmit direction, the user interface would write the data payload into one of the transmit packet buffers. Once the data payload was completely written, the pointer to the transmit packet buffer would be passed to the processor.

The processor would then write the protocol headers into the transmit packet buffer through the same port that the user interface used in the previous step. When the processor has finished writing the protocol headers, the packet would be passed to the network interface. The network interface would then read the packet from the second port and send the packet across the network.

Through the use of multiple individual multi-port memories, bandwidth is increased without the complexity of providing access to the same memory by three interfaces: the network interface, user interface, and Processor.

The single ported shared buffer could resolve the access contentions between each of these ports through the use of a higher clock rate, and time division multiplexing between the three modules. However, the multiple individual multi-port memories allows for high bandwidth at a reduced clock rate. The slower clock rate allows for much lower power consumption, which is a benefit in many applications. One such application is battery powered portable equipment.

Another embodiment would be a modified receive and transmit protocol aware logic that could handle application layer protocols. One example protocol would be the real-time transport protocol, RTP. RTP is used in network video and voice communications, and uses the UDP protocol for transport through a network. Through the use of the "fast path" in the preferred embodiment, and added RTP protocol support packet reception and transmission would be maintained without any processor intervention. The processor would only be needed to establish the connection, terminate the connection, and process non-RTP packets. This alternative embodiment would allow for very low cost network enabled telephones and video equipment.

Another embodiment for the transmit direction would allow for the Ethernet header 100 and protocol headers 121 to be stored in separate header buffer. The network interface 900, would then transmit the Ethernet header 100 and protocol headers 121 from the header buffer, and then transmit the data payload 106. The advantage to this method is the network stack 925 could build the Ethernet header 100 and protocol header 121 before, or while the data payload 106 is being written into the shared buffer 905. Many times, the Ethernet header 100 and the protocol headers 121 do not change much from packet to packet. Therefore, the entire header buffer would not have to be rebuilt for each packet.

FIG. 1 was provided in order to provide context for the various manipulations to packet components by the prior art methods and the disclosed invention. The invention is not limited to the specific packet types illustrated in FIG. 1 and one of ordinary skill in the art could apply the teachings of the present invention to a device for processing another known packet format.

The preferred embodiment of the present invention implements the protocol aware logic on both the incoming and outgoing paths. One of skill in the art could implement the protocol aware logic on only one path. Such a network processor would be best used for an application with a disparity in upstream and downstream traffic such that the direction with the higher traffic flow would have the benefit of the protocol aware logic. One such application would be a video server, in which most of the data is in the outgoing path. Therefore, the receive direction would not need the speed improvements of the receive path.

The preferred embodiment offloads several tasks from the processor unit with network stack to the transmit protocol aware logic and the receive protocol aware logic. One of skill in the art could choose to retain one or more of these tasks for the processor unit with network stack. For example, the processor unit with network stack could perform the steps necessary to discern the socket for a network packet or data payload.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

We claim:

1. A method for a processor to process an incoming network packet, the processor comprising:
   a. A network interface adapted for connection to a communication network;
   b. A receive protocol aware logic module;
   c. A user interface adapted to pass a data payload;
   d. A processor unit with network stack; and
   e. Shared buffer accessible by: the network interface, the user interface, and the processor unit with network stack;

The Method Comprising:
   A) the network interface receiving a network packet from the network destined for a first existing socket and writing the network packet to a segment of memory in the shared buffer, the network packet having the properties of:
      a. having at least one checksum indicating a non-corrupted transmission; and
      b. addressed to an existing socket; the network packet comprising:
         a. a transport header;
         b. a protocol header; and
         c. a data payload;
   B) the receive protocol aware logic module detecting the process of writing of the network packet to the shared buffer and confirming that a checksum value contained in the protocol header matches a newly calculated checksum; and
   C) the processor with network stack starting to process the protocol header of the network packet while the network interface is writing the network packet to the segment of memory in the shared buffer.

2. The method of claim 1 wherein the receive protocol aware logic module also confirms that the transport checksum contained in the network packet matches a newly calculated transport checksum.

3. The method of claim 1 further comprising:
   D) the network interface receiving a second network packet from the network destined for a second existing socket, differing from the socket for the first network packet, the second existing socket designated as a fast-path socket and writing the second network packet to a second segment of memory in the shared buffer;
   E) the receive protocol aware logic module passing a pointer to start of payload and a payload length to user interface;
   F) informing the user interface of a valid data payload from the second network packet;

G) allowing circuitry connected to the user interface to read the data payload from the second segment of memory in the shared buffer; and H) releasing the second segment of memory in the shared buffer.

4. The method of claim 1 wherein the shared buffer is comprised of at least two receive packet buffers.

5. The method of claim 1 wherein the user interface supports at least two different interface signaling methods.

6. The method of claim 1 further comprising:
D) the receive protocol aware logic module communicating to the user interface a location and length corresponding to the data payload portion of the network packet in the shared buffer; and
E) the receive protocol aware logic module communicating information to the processor unit with network stack regarding a socket for the network packet.

7. The method of claim 6 wherein the information communicated to the processor unit with network stack regarding the socket for the network packet is a pointer to a socket management data structure stored in a processor memory accessible by the processor unit with network stack.

8. The method of claim 6 further comprising:
F) signaling to the processor unit with network stack the completion of writing the network packet to the shared buffer;
G) processing the data payload by the processor unit with network stack; and
H) releasing the memory segment of the shared buffer.

9. The method of claim 8 wherein the network interface writes the packet to the segment of memory in the shared buffer through a first port and the processor unit with network stack accesses the contents of the segment of memory through a second port.

10. The method of claim 6 further comprising:
F) signaling to the processor unit with network stack the completion of writing the network packet to the shared buffer;
G) informing the user interface of a valid data payload;
H) allowing circuitry connected to the user interface to read the data payload from the shared buffer; and
I) releasing the memory segment of the shared buffer.

11. The method of claim 10 wherein the network interface writes the packet to the segment of memory in the shared buffer through a first port and the user interface accesses the contents of the segment of memory through a second port.

12. The method of claim 1 wherein the processor further comprises a second user interface adapted to pass a network packet segment;
the method further comprising:
D) the network interface receiving a second network packet from the network destined for an existing socket different from the socket for the first network packet and writing the second network packet to a segment of memory in the shared buffer,
the network packet segment comprising:
  a. a transport header
  b. protocol header; and
  c. a data payload; and;
E) communicating to the second user interface a location and length corresponding to the network packet segment in the shared buffer.

13. The method of claim 12 wherein network packet segment in the shared buffer is accessed through the user interface and the protocol header of the second network packet is not processed by the processor unit with protocol stack.

14. A method for providing an incoming network packet to a user interface, the processor comprising:
a. A network interface adapted for connection to a communication network;
b. A receive protocol aware loge module;
c. A user interface adapted to pass a data payload;
d. A processor unit with network stack;
e. Shared buffer accessible by: the network interface and the user interface, and;

The Method Comprising:
A) the network interface receiving a network packet from the network destined for a first existing fast path socket and writing the network packet to a segment of memory in the shared buffer, the network packet comprising:
  a. a transport header;
  b. a protocol header, and
  c. a data payload;
B) the receive protocol aware logic module a passing pointer to a start of payload and a payload length to the user interface;
C) the receive protocol aware logic module informing the user interface of a valid data payload from the network packet;
D) allowing the circuitry connected to the user interface to read the data payload from the segment of memory in the shared buffer; and
E) releasing the segment of memory in the shared buffer.

15. A method for a processor to create a network packet to convey a data payload received through a user interface, the processor comprising:
a. A network interface adapted for connection to a communication network;
b. A transmit protocol aware logic module;
c. A user interface adapted to pass a data payload;
d. A processor unit with network stack;
e. A processor memory accessible by the processor unit with network stack;
f. Shared buffer accessible by: the network interface, the user interface; and the processor unit with network stack;

The Method Comprising:
A) user interface allowing a connected device to write a data payload into the shared buffer;
B) as the data payload is being written into the shared buffer through the user interface, the transmit protocol aware logic module beginning to create at least one protocol checksum to be used in the network packet to convey the data payload;
C) the processor with network stack writing a partially completed protocol header into the shared buffer;
D) the transport protocol aware logic module providing the at east one protocol checksum for use in the partially completed protocol header;
E) informing the network interface of the network packet in the shared buffer;
F) the network interface reading the network packet components from the shared buffer; and
G) the network interface transmitting the network packet into the network.

16. The method of claim 15 wherein the transmit protocol aware logic module creates a first protocol checksum and a second protocol checksum for nested protocols used in the network packet before the addition of a transport checksum for use in the network packet.

17. The method of claim 15 wherein the network interface calculates a transport checksum for the network packet in preparation for transmitting the network packet into the network.

18. The method of claim 15 further comprising the step of the processor unit with network stack obtaining a socket for the network packet to convey the data payload from the transmit protocol aware logic module which passes a pointer to a socket management data structure stored in the processor memory.

19. The method of claim 15 wherein a protocol offset is stored for each active socket and the data payload is written into the shared buffer at a protocol offset corresponding to the socket associated with that payload such that there is room in the data buffer to place a combination of the protocol header and the transmit header adjacent to the data payload in the shared buffer.

20. The method of claim 15 wherein the data payload is stored in a payload section of the shared buffer and the header information associated with the data payload is stored in a header section of the shared buffer and further comprising the step of the transmit protocol aware logic module constructing the network packet where the step of constructing includes placing the header information and the data payload in proper order for the network packet.

21. The method of claim 15 wherein the shared buffer is comprised of at least two transmit packet buffers.

22. The method of claim 15 wherein the user interface writes the packet to the segment of memory in the shared buffer through a first port and the network interface accesses the contents of the segment of memory through a second port.

23. The method of claim 15 wherein the user interface supports at least two different interface signaling methods.

24. A method for a processor to create a network packet, the processor comprising:
   a. A network interface adapted for connection to a communication network;
   b. A transmit protocol aware logic module;
   c. A processor unit with network stack; and
   d. Shared buffer accessible by: the network interface and the processor unit with network stack;

The Method Comprising:
   A) the processor unit with network stack writing a partially completed network packet into the shared buffer;
   B) as the network packet is being written into the shared buffer, the transmit protocol aware logic module beginning to create at least one protocol checksum to be used in the network packet;
   C) writing the at least one protocol checksum into the partially completed network packet; and
   D) informing the network interface of the network packet in the shared buffer.

25. The method of claim 24 wherein the network interface calculates a transport checksum for the network packet while transmitting the network packet into the communication network.

26. The method of claim 24 wherein the processor unit with network stack writes the packet to the segment of memory in the shared buffer through a first port and the network interface accesses the contents of the segment of memory through a second port.

* * * * *